US012591354B2

(12) United States Patent
Fusayasu et al.

(10) Patent No.: US 12,591,354 B2
(45) Date of Patent: Mar. 31, 2026

(54) MEASURING DEVICE

(71) Applicant: MITUTOYO CORPORATION,
Kanagawa (JP)

(72) Inventors: Yuya Fusayasu, Miyazaki (JP);
Hiroomi Honda, Miyazaki (JP);
Takashi Shintaku, Hiroshima (JP);
Kazuya Ibi, Hiroshima (JP)

(73) Assignee: MITUTOYO CORPORATION,
Kanagawa (JP)

( * ) Notice: Subject to any disclaimer, the term of this
patent is extended or adjusted under 35
U.S.C. 154(b) by 271 days.

(21) Appl. No.: 18/607,707

(22) Filed: Mar. 18, 2024

(65) Prior Publication Data

US 2024/0329804 A1     Oct. 3, 2024

(30) Foreign Application Priority Data

Mar. 30, 2023     (JP) ................................. 2023-055394

(51) Int. Cl.
| | |
|---|---|
| *G06F 3/048* | (2013.01) |
| *G06F 3/02* | (2006.01) |
| *G06F 3/041* | (2006.01) |
| *G06F 3/0482* | (2013.01) |
| *G06F 3/04847* | (2022.01) |

(52) U.S. Cl.
CPC .......... *G06F 3/0482* (2013.01); *G06F 3/0219*
(2013.01); *G06F 3/0412* (2013.01); *G06F*
*3/04847* (2013.01)

(58) Field of Classification Search
None
See application file for complete search history.

(56) References Cited

U.S. PATENT DOCUMENTS

| | | | |
|---|---|---|---|
| 8,359,908 | B2 | 1/2013 | Yamada et al. |
| 8,701,301 | B2 | 4/2014 | Nakayama et al. |
| 8,915,124 | B2 | 12/2014 | Nakayama |
| 9,091,521 | B2 | 7/2015 | Nakayama et al. |
| 9,151,589 | B2 | 10/2015 | Kanematsu et al. |
| 9,170,084 | B2 | 10/2015 | Honda et al. |
| 9,372,595 | B2 | 6/2016 | Fukuda et al. |
| 10,605,583 | B2 | 3/2020 | Honda et al. |

(Continued)

FOREIGN PATENT DOCUMENTS

| | | |
|---|---|---|
| JP | 2013-195216 A | 9/2013 |

*Primary Examiner* — Tuan S Nguyen
(74) *Attorney, Agent, or Firm* — GREENBLUM &
BERNSTEIN, P.L.C.

(57)     ABSTRACT

A surface texture measuring machine includes a display
section, a touch panel arranged on the display section, a key
group, a display control section that causes a first setting
screen to be displayed on the display section, a setting
section that creates a measurement condition in accordance
with an input operation on the first setting screen through the
touch panel, a storage that stores the measurement condition,
and an input control section that switches a state of the touch
panel between a disabled state and an enabled state. When
the touch panel is in the disabled state, the display control
section causes a second setting screen to be displayed on the
display section in accordance with the input operation
through the key group and the setting section reads the
measurement condition from the storage in accordance with
the input operation on the second setting screen through the
key group.

6 Claims, 6 Drawing Sheets

(56)               References Cited

U.S. PATENT DOCUMENTS

| | | | |
|---|---|---|---|
| 2010/0279657 A1* | 11/2010 | Matsuo | H04M 1/0235 |
| | | | 345/173 |
| 2015/0084737 A1* | 3/2015 | Li | G06F 3/0488 |
| | | | 340/5.2 |
| 2015/0286354 A1* | 10/2015 | Niwano | G06F 3/0482 |
| | | | 715/831 |
| 2016/0061579 A1* | 3/2016 | Tsujimoto | G01B 21/047 |
| | | | 702/155 |
| 2022/0373316 A1 | 11/2022 | Honda | |

* cited by examiner

F I G . 5
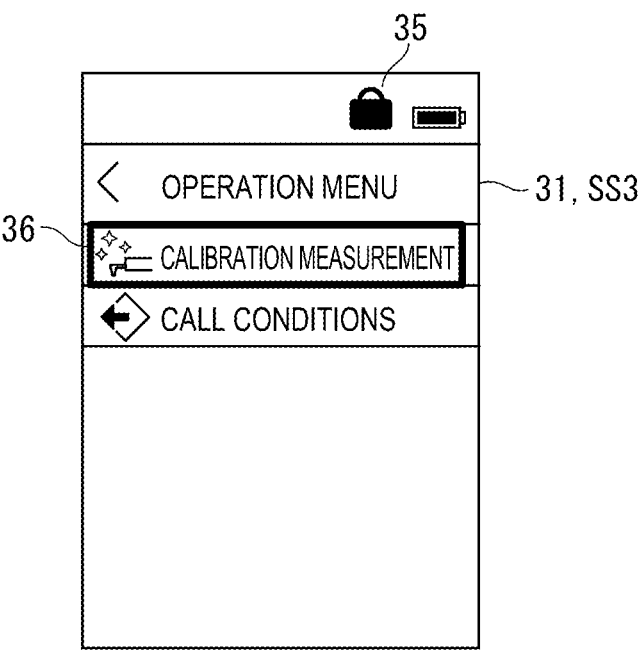

MEASURING DEVICE

CROSS REFERENCE TO RELATED APPLICATIONS

The entire disclosure of Japanese Patent Application No. 2023-055394 filed Mar. 30, 2023 is expressly incorporated by reference herein.

TECHNICAL FIELD

The present invention relates to a measuring device in which a measurement condition is allowed to be set through a touch panel.

BACKGROUND ART

In a conventional surface texture measuring machine capable of measuring various surface textures of an object, measurement conditions such as a variety of parameters are set in accordance with desired contents to be measured. In order to facilitate the setting of a measurement condition, in one surface texture measuring machine, the measurement condition is allowed to be set through a touch panel (for instance, see Literature 1: JP 2013-195216 A).

When a measurement operator touches a touch panel by mistake in a conventional surface texture measuring machine, a measurement condition is liable to be incorrectly set. The inventors thus discuss disabling a touch panel after the setting of a measurement condition.

Here, a plurality of measurements with different measurement conditions may be continuously performed. In this case, a measurement work would be complicated because an operation to switch disabling/enabling of the touch panel is needed before and after changing the measurement condition. Such a problem applies to all measuring devices in which a measurement condition is allowed to be set through a touch panel.

SUMMARY OF THE INVENTION

An object of the invention is to provide a measuring device configured to easily change a measurement condition while preventing a measurement operator from making an incorrect setting.

According to an aspect of the invention, there is provided a measuring device including: a display section; a touch panel arranged on the display section to overlap therewith; a key group including a plurality of physical keys; a display control section configured to cause a first setting screen to be displayed on the display section; a setting section configured to create a measurement condition in accordance with an input operation on the first setting screen through the touch panel; a storage configured to store the measurement condition created by the setting section; and an input control section configured to switch a state of the touch panel between a disabled state and an enabled state, in which in a case where the touch panel is in the disabled state, the display control section is configured to cause a second setting screen to be displayed on the display section in accordance with an input operation through the key group, and the setting section is configured to read the measurement condition from the storage in accordance with an input operation on the second setting screen through the key group.

In such a configuration, since the touch panel is in the disable state, the measurement condition is prevented from being incorrectly set even when the measurement operator touches the touch panel by mistake. Further, the measurement condition stored in advance can be read and set by operating the physical key group with the touch panel being in the disabled state. The measurement operator thus easily changes the measurement condition while being prevented from making an incorrect setting.

In the measuring device according to the aspect of the invention, preferably, the input control section is configured to switch a state of the touch panel between the disabled state and the enabled state in accordance with a switching instruction inputted from one of the keys or an external device.

In such a configuration, a state of the touch panel is flexibly switchable between the enabled state and disabled state in accordance with the situation of the administrator or the measurement operator.

In the measuring device according to the aspect of the invention, in a case where the state of the touch panel is switched from the enabled state to the disabled state in accordance with the switching instruction inputted from the external device, the input control section may have a state of receiving no switching instruction through any of the keys. The measurement operator is thus more reliably prevented from incorrectly setting the measurement condition.

In the measuring device according to the aspect of the invention, the input control section may perform switching between a first state, a second state, and a third state every time the switching instruction is inputted from the external device, the first state being a state where the touch panel and the key group are both in the enabled state, the second state being a state where the touch panel and the key group are both in the disabled state, the third state being a state where the touch panel is in the disabled state and the key group is in the enabled state.

In such a configuration, both the touch panel and the key group are in the disable state, for instance, during the communication between the external device and the measuring device, allowing the measurement operator to be prevented from operating the measuring device and to stably operate the measuring device from the external device.

In the measuring device according to the aspect of the invention, the first setting screen may receive an input operation regarding one or more parameters that constitute the measurement condition, the measurement may include a plurality of measurement conditions, and the second setting screen may receive an input operation to select one of the plurality of measurement conditions stored in the storage.

Such a configuration makes it possible to set a variety of measurement conditions and to prevent the measurement operator from changing the variety of measurement conditions by mistake.

Preferably, the measuring device according to the aspect of the invention further includes an input section configured to identify the input operation corresponding to each of the keys for each of the screens displayed on the display section, in which the second setting screen is configured to display a measurement condition list including, in list form, the plurality of measurement conditions stored in the storage, and in a case where the second setting screen is displayed on the display section, the input section is configured to identify the input operation from the key group as cursor movement or determination on the measurement condition list.

Such a configuration makes it possible to reduce the number of the physical keys, facilitating downsizing of the measuring device.

BRIEF DESCRIPTION OF DRAWINGS

FIG. 5 illustrates an exemplary work screen of the first exemplary embodiment.

DETAILED DESCRIPTION

First Exemplary Embodiment

Figure 1:
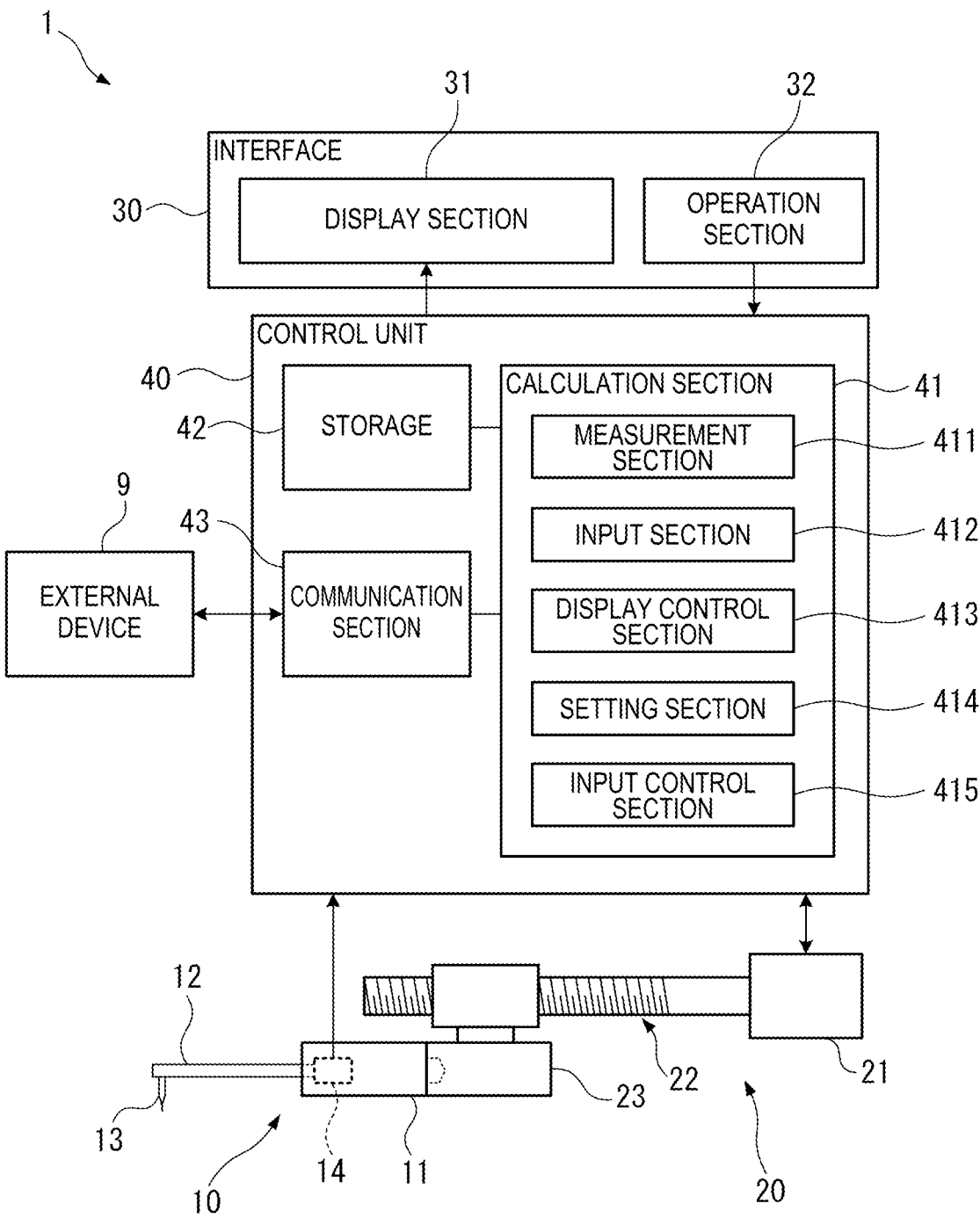
FIG. 1 is a schematic diagram illustrating a schematic configuration of a surface texture measuring machine of a first exemplary embodiment.

Referring to the drawings, description will be made on a first exemplary embodiment of the invention.

Configuration of Surface Texture Measuring Machine

As illustrated in FIG. 1, a surface texture measuring machine 1 of the exemplary embodiment includes a detector 10 that detects displacement of a surface of an object, a driving unit 20 that moves the detector 10, a user interface 30, and a control unit 40 that performs a variety of controls. The surface texture measuring machine 1 of the exemplary embodiment, which is a handheld measuring machine, further includes a casing 50 (see FIG. 2) that houses the detector 10, the driving unit 20, and the control unit 40 together. In the following description, an administrator and a measurement operator are assumed as users of the surface texture measuring machine 1.

The detector 10 is not particularly limited as long as having a structure that detects displacement of a surface of an object. For instance, the detector 10 illustrated by way of example in FIG. 1 includes a detector body 11 held by the driving unit 20, a stylus arm 12 swingably supported by the detector body 11, a stylus 13 (a sensing pin) protruding from a distal end of the stylus arm 12, and a detection element 14 that detects a swinging amount of a base end of the stylus arm 12. The stylus 13 illustrated by way of example in FIG. 1 is a skidless stylus but may be a skidded stylus.

The driving unit 20 is not particularly limited as long as having a structure that moves the detector 10 along a measurement direction. For instance, the driving unit illustrated by way of example in FIG. 1 includes a motor 21 fixed to the casing 50, a screw feed mechanism 22 coupled to the motor 21, and a holding member 23 to be fed in the measurement direction by the screw feed mechanism 22. The holding member 23 holds the detector body 11. The amount of movement in the measurement direction is detectable by a desired means.

Figure 2:
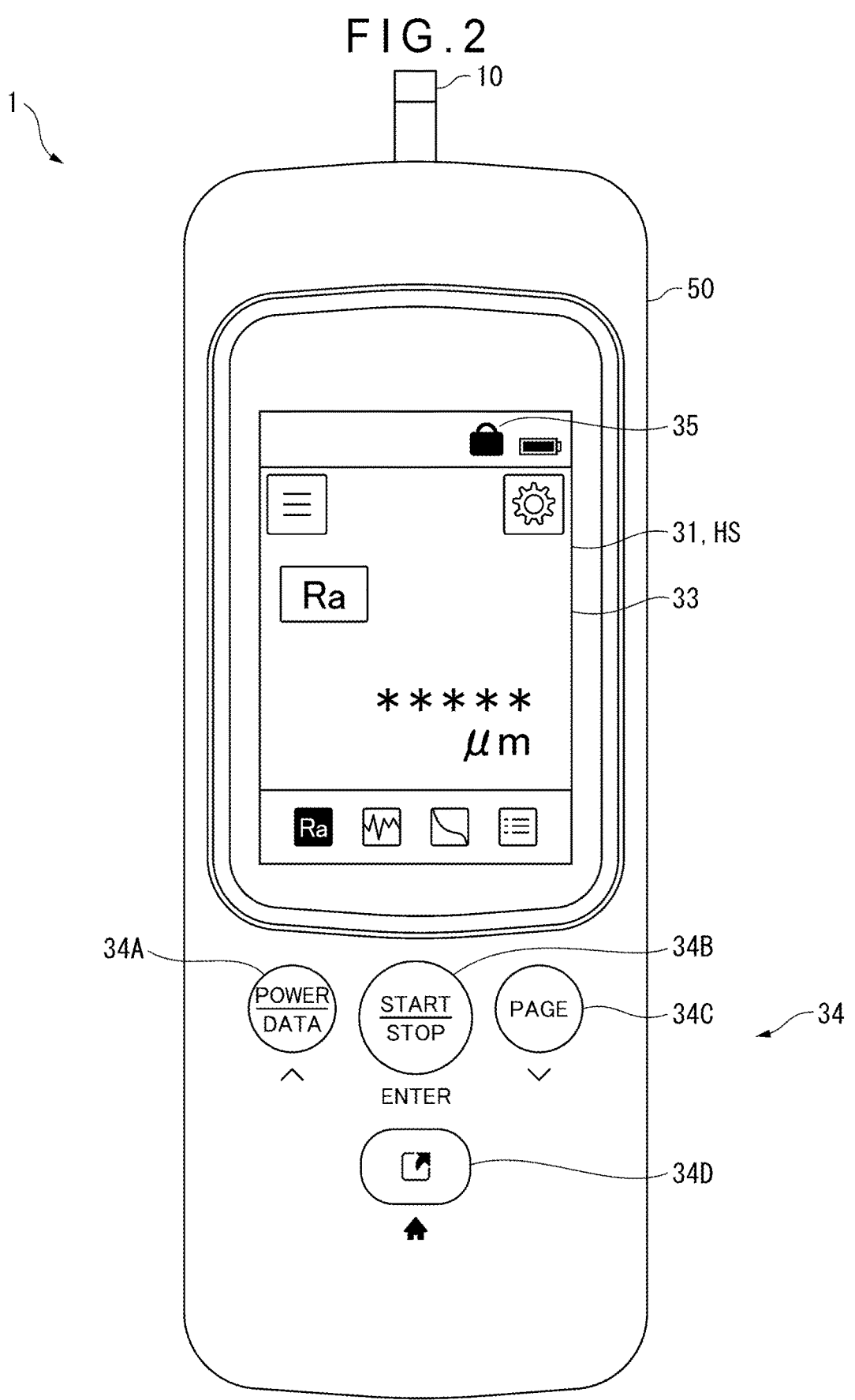
FIG. 2 is a front view illustrating an appearance of the surface texture measuring machine of the first exemplary embodiment.

The user interface 30 includes a display section 31 on which a variety of information is displayed and an operation section 32 that receives a user's input operation. As illustrated in FIG. 2, the display section 31 is in a form of a liquid crystal display, an organic EL display, or the like. The display section 31 is located in an upper surface of the casing 50. The operation section 32 includes a touch panel 33 arranged on the display section 31 to overlap therewith and a key group 34 arranged on the upper surface of the casing 50.

The touch panel 33 detects a touch operation of a user performed on the display section 31 and outputs a touch signal corresponding to touch coordinates. A specific structure of the touch panel 33 is not particularly limited. For instance, the touch panel 33 may be a resistive touch panel or a capacitive touch panel.

The key group 34 includes a plurality of physical keys 34A to 34D located near the display section 31 on the upper surface of the casing 50. The keys 34A to 34D each detect a user's press operation and output a key signal.

The control unit 40, which in a form of a computer, controls the detector 10 and the driving unit 20. As illustrated in FIG. 1, the control unit 40 includes a calculation section 41 configured by a central processing unit (CPU) or the like, a storage 42 configured by a memory or the like, and a communication section 43. Further, the calculation section 41 reads and executes a program stored in the storage 42, thereby functioning as a measurement section 411, an input section 412, a display control section 413, a setting section 414, and an input control section 415.

The measurement section 411 performs various processes related to a measurement based on a measurement condition set (created or read) by the setting section 414. For instance, the measurement section 411 controls movement of the detector 10 by controlling the driving unit 20. Further, the measurement section 411 acquires displacement measurement data in a measurement range by sampling a detection signal outputted from the detector 10 and calculates a measurement result. Furthermore, the measurement section 411 determines based on the measurement result whether the object passes or fails.

The input section 412 acquires the touch coordinates of the touch signal inputted from the touch panel 33 and identifies the input operation corresponding to the touch coordinates. Further, the input section 412 acquires a key signal inputted from each of the keys 34A to 34D and identifies the input operation corresponding to the key signal. The type of the input operation corresponding to each of the touch coordinates and the key signal is stored in the storage 42 for each screen to be displayed on the display section 31.

The display control section 413 controls, based on the input operation identified by the input section 412, a screen to be displayed on the display section 31. Exemplary screens to be displayed on the display section 31 include a home screen HS (see FIG. 2), a first setting screen SS1 (see FIG. 3), a second setting screen SS2 (see FIG. 4), and a work screen SS3 (see FIG. 5). The home screen HS is a screen in which the measurement is allowed to be started if a measurement condition is already set. The first setting screen SS1 and the second setting screen SS2 are each a screen for setting a measurement condition. The work screen SS3 is a screen for calling the second setting screen SS2 or a calibration screen (illustration omitted).

Figure 3:
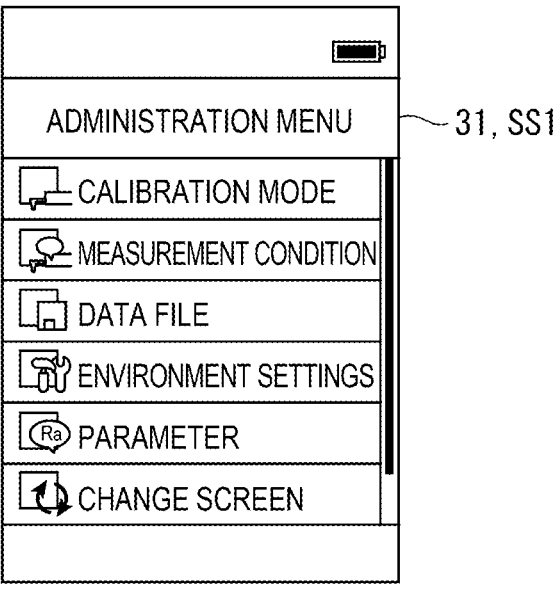
FIG. 3 illustrates an exemplary first setting screen of the first exemplary embodiment.

The first setting screen SS1 illustrated by way of example in FIG. 3 is a screen for creating and setting a measurement condition based on the assumption of an input operation through the touch panel 33. The first setting screen SS1 includes, in addition to the screen illustrated by way of example in FIG. 3, a plurality of screens switched and displayed in accordance with the input operation through the touch panel 33, allowing for setting a variety of measurement conditions.

Figure 4:
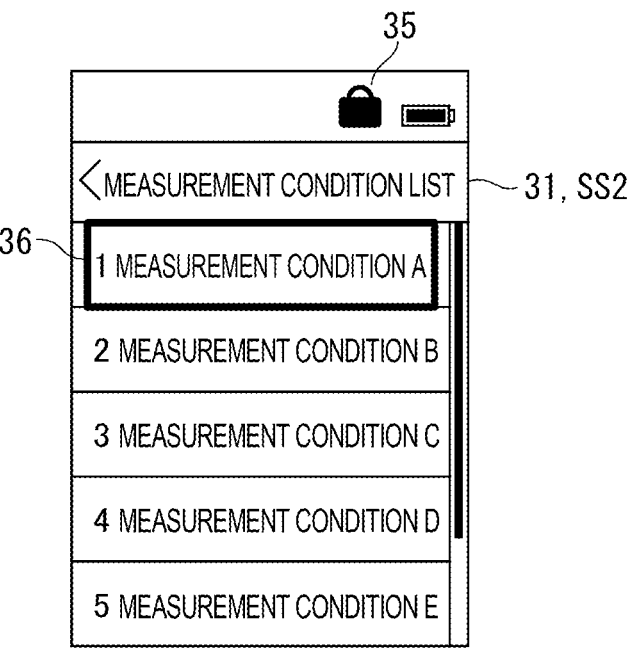
FIG. 4 illustrates an exemplary second setting screen of the first exemplary embodiment.

The second setting screen SS2 illustrated by way of example in FIG. 4 is a screen for reading and setting a measurement condition from the storage 42 based on the assumption of an input operation through the key group 34.

The second setting screen SS2 displays a measurement condition list including a plurality of measurement conditions in list form so that a measurement condition as a readout target is allowed to be selected by a simple input operation through the key group 34. The measurement condition list of the exemplary embodiment includes the plurality of measurement conditions stored in the storage 42 in list form. Further, the second setting screen SS2 also displays a cursor 36 for indicating a selection target in accordance with the input operation through the key group 34.

The work screen SS3 illustrated by way of example in FIG. 5 is a screen based on the assumption of an input operation through the key group 34 similar to the second setting screen SS2. The work screen SS3 displays a "CALL CONDITIONS" for causing the second setting screen SS2 to be displayed and "CALIBRATION MEASUREMENT" for causing the calibration screen to be displayed. Further, the work screen SS3 also displays the cursor 36 for indicating a selection target.

When the touch panel 33 is in a disabled state, the display control section 413 displays an icon 35 in a status display range common to respective screens, the icon 35 indicating that the touch panel 33 is in the disabled state (e.g., see FIG. 2). When the state of the touch panel 33 is switched from the disabled state to an enabled state, the display control section 413 causes the icon 35 to disappear.

When the first setting screen SS1 is displayed on the display section 31, the setting section 414 can create a measurement condition in accordance with an input operation on the first setting screen SS1 through the touch panel 33 and cause the storage 42 to store the measurement condition. When the second setting screen SS2 is displayed on the display section 31, the setting section 414 can read a measurement condition from the storage 42 in accordance with an input operation on the second setting screen SS2 through the key group 34. In other words, the setting section 414 can set the measurement condition by creating or reading the measurement condition.

The input control section 415 switches a state of the touch panel 33 between the disabled state and the enabled state in accordance with a switching instruction inputted through a predetermined key (the key 34C in the exemplary embodiment). Specifically, the input control section 415 performs the switching of touch panel 33 state to the disabled state when the touch panel 33 in the enabled state receives the switching instruction. The input control section 415 performs the switching of touch panel 33 state to the enabled state when the touch panel 33 in the disabled state receives the switching instruction.

The disabled state of the touch panel 33 may be any state as long as an input operation through the touch panel 33 is disabled. For instance, when the touch panel 33 is in the disabled state, the input section 412 acquires no touch coordinates of a touch signal inputted from the touch panel 33.

The storage 42 stores a program causing the calculation section 41 to operate, or the like. The storage 42 also stores a touch-event table indicating types of input operations assigned to touch coordinates, a key-event table indicating types of input operations assigned to the keys 34A to 34D, one or more measurement conditions for measuring a surface of an object, a history of a measurement result, and the like.

The touch-event table and the key-event table each include a table corresponding to each of screens displayed on the display section 31. For instance, the key-event table includes a home screen table corresponding to the home screen HS, a first setting screen table corresponding to the first setting screen SS1, a second setting screen table corresponding to the second setting screen SS2, and a work screen table corresponding to the work screen SS3.

Here, an exemplary key-event table will be specifically described.

In the home screen table, "DATA OUTPUT" is assigned to the key 34A (a short press), "POWER ON/OFF" is assigned to the key 34A (a long press), and "MEASUREMENT START/STOP" is assigned to the key 34B. Further, "TURN PAGE" is assigned to the key 34C (a short press). Furthermore, "MOVE TO SECOND SETTING SCREEN" is assigned to the key 34D.

In the first setting screen table, "MOVE TO HOME SCREEN" is assigned to the key 34D.

In each of the second setting screen table and the work screen table, "MOVE CURSOR UPWARD" is assigned to the key 34A, "CONFIRMED" is assigned to the key 34B, and "MOVE CURSOR DOWNWARD" is assigned to the key 34C. Further, "MOVE TO HOME SCREEN" is assigned to the key 34D.

In the above tables, "SWITCHING BETWEEN ENABLING AND DISABLING OF TOUCH PANEL" is assigned in common to the key 34C (a long press).

The measurement condition includes a driving parameter, a measurement parameter, a determination parameter, and the like. The driving parameter includes a movement speed, a measurement range, an evaluation length, and the like of the detector 10 during measurement. The measurement parameter includes a type of roughness standards, a type of a roughness parameter, a filter to be applied to data, and the like. The determination parameter includes a condition (for instance, an upper limit and a lower limit) for determining passing/failing with respect to a measurement result. The type of the roughness parameter is exemplified by an arithmetic mean roughness Ra, a maximum height Ry, a ten point mean roughness Rz, a root mean square roughness Rq, a maximum roughness Rt, a maximum peak height Rp, a maximum valley depth Rv, and a mean interval Sm between irregularities. It is only necessary for the measurement condition of the exemplary embodiment to include at least one parameter.

The communication section 43 communicates with an external device 9 by wire or wirelessly. The external device 9 is not particularly limited, and may be in a form of a computer such as a smartphone, a tablet terminal, or a personal computer. The external device 9 is installed with application software to communicate with the surface texture measuring machine 1 and is configured to receive a measurement result or the like from the surface texture measuring machine 1.

Measurement Method Using Surface Texture Measuring Machine

Referring to a flowchart in FIG. 6, an exemplary measurement method using the surface texture measuring machine 1 of the exemplary embodiment will be described. An administrator who sets a measurement condition and a measurement operator who performs measurement are assumed as users of the surface texture measuring machine 1 hereinbelow. Further, description will be made below on a case where measurement is sequentially performed based on each of mutually different measurement conditions.

First, the administrator operates the touch panel 33 of the surface texture measuring machine 1 to cause the first setting screen SS1 to be displayed on the display section 31. The administrator then creates a measurement condition by inputting one or more parameters that constitute the measurement condition to the first setting screen SS1 through the touch panel 33, and causes the storage 42 to store the measurement condition. Here, the administrator creates a plurality of desired measurement conditions in sequence and causes the storage 42 to store the measurement conditions (Step S1).

Next, the administrator presses the key 34D to cause the home screen HS to be displayed on the display section 31 and long-presses the key 34C to switches a state of the touch panel 33 from the enabled state to the disabled state (Step S2). This causes the icon 35 indicating that the touch panel 33 is in the disabled state to be displayed on the display section 31. Note that even when any other screen than the home screen HS is displayed, the state of the touch panel 33 can be switched from the enabled state to the disabled state by long-pressing the key 34C.

After that, the administrator hands the surface texture measuring machine 1 over to the measurement operator. The measurement operator presses the key 34D once on the home screen HS to cause the work screen SS3 (see FIG. 5) to be displayed on the display section 31. When any other screen than the home screen HS is displayed, the measurement operator only has to press the key 34D once to cause that screen to transition to the home screen HS, and to press the key 34D once more to cause the work screen SS3 to be displayed. The measurement operator operates the cursor 36 with the key group 34 and selects "CALL CONDITIONS" from the work screen SS3, causing the second setting screen SS2 (see FIG. 4) to be displayed (Step S3). The second setting screen SS2 displays the measurement condition list, which is a list of the plurality of measurement conditions stored in Step S1.

With the measurement condition list being displayed, the measurement operator operates the cursor 36 with the key group 34 and selects a desired measurement condition from the measurement condition list. Specifically, "MOVE CURSOR UPWARD" or "MOVE CURSOR DOWNWARD" is inputted by pressing the key 34A or the key 34C and "CONFIRMED" is inputted by pressing the key 34B with the cursor 36 being placed at the desired measurement condition. This causes the desired measurement condition to be read and set in the surface texture measuring machine 1 (Step S4).

Next, the measurement operator inputs "MOVE TO HOME SCREEN" by pressing the key 34D, causing the home screen HS to be displayed on the display section 31. Then, with the surface texture measuring machine 1 being set with respect to an object, "MEASUREMENT START" is inputted by pressing the key 34B. The surface texture measuring machine 1 thus performs the measurement according to the set measurement condition (Step S5).

After that, the measurement operator performs Steps S3 to S5 described above every time the measurement condition is changed. In response to termination of all scheduled measurements (Step S6: YES), the flowchart in FIG. 6 is terminated. Here, it is assumed that the touch panel 33 is kept in the disabled state while Steps S3 to S5 described above are performed.

The above-described measurement method is merely by way of example and the surface texture measuring machine 1 of the exemplary embodiment may be used in any other method.

For instance, with the work screen SS3 in FIG. 5 being displayed, the measurement operator may operate the cursor 36 with the key group 34 and select "CALIBRATION MEASUREMENT" from the work screen SS3 to cause the calibration screen to be displayed. After that, the measurement operator can perform a calibration measurement by operating the key group 34.

Figure 6:
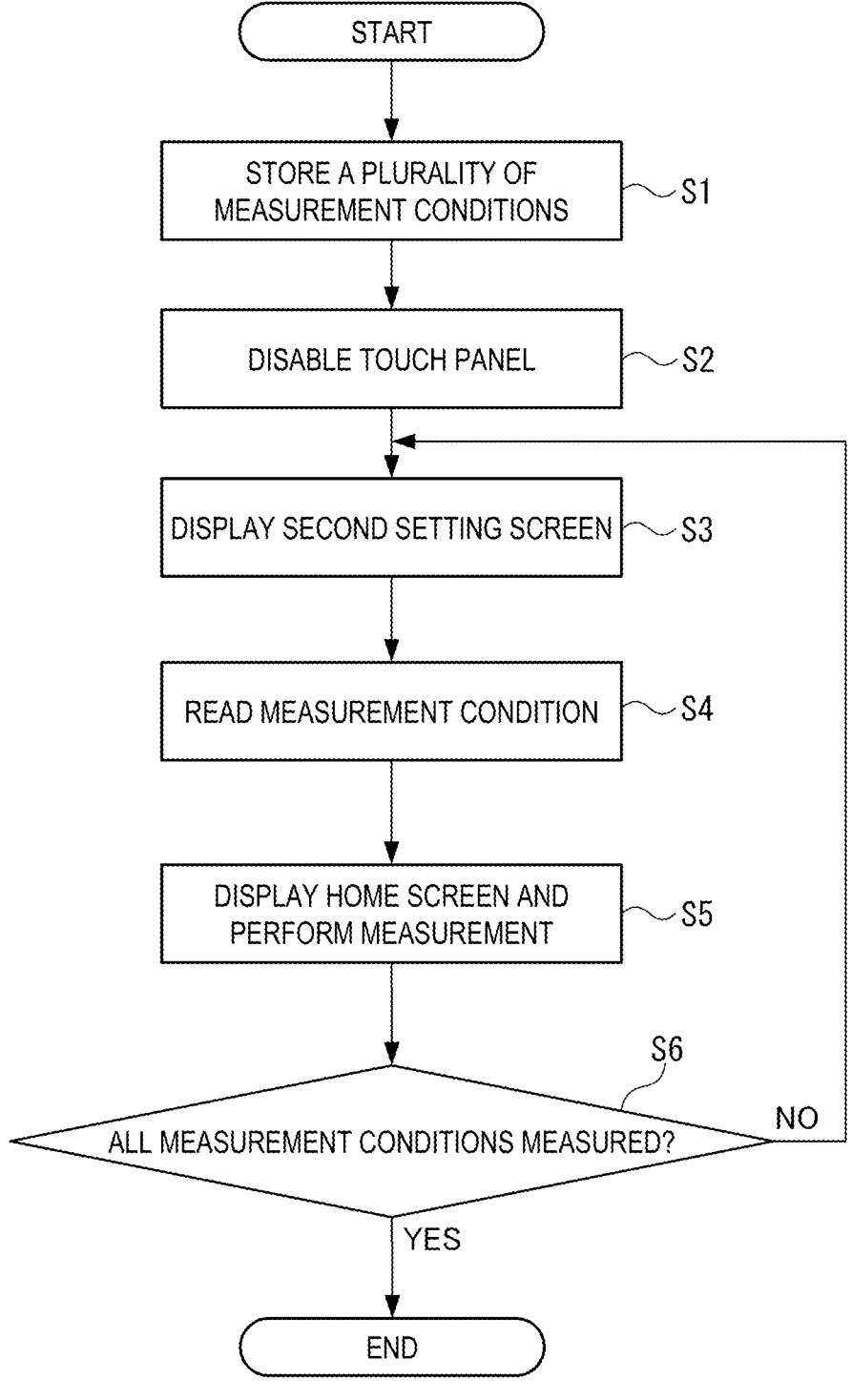
FIG. 6 is a flowchart illustrating an exemplary measurement method using the surface texture measuring machine of the first exemplary embodiment.

Further, in the flowchart in FIG. 6, Steps S3 and S4 may be omitted for the first measurement. In this case, in Step S5, the measurement may be performed in accordance with the measurement condition set by the administrator through the touch panel 33.

Workings and Effects of the Exemplary Embodiment

The surface texture measuring machine 1 of the exemplary embodiment includes the display section 31, the touch panel 33 arranged on the display section 31 to overlap therewith, the key group 34 including the plurality of physical keys 34A to 34D, the display control section 413 that causes the first setting screen SS1 to be displayed on the display section 31, the setting section 414 that creates a measurement condition in accordance with an input operation on the first setting screen SS1 through the touch panel 33, the storage 42 that stores the measurement condition created by the setting section 414, and the input control section 415 that switches a state of the touch panel 33 between the disabled state and the enabled state, as described above. When the touch panel 33 is in the disabled state, the display control section 413 is configured to cause the second setting screen SS2 to be displayed on the display section 31 in accordance with the input operation through the key group 34 and the setting section 414 is configured to read the measurement condition from the storage 42 in accordance with the input operation on the second setting screen SS2 through the key group 34.

In such a configuration, since the touch panel 33 is in the disable state, the measurement condition is prevented from being incorrectly set even when the measurement operator touches the touch panel 33 by mistake. This makes it possible to prevent the measurement operator from performing the measurement without noticing the erroneous change in measurement condition, and consequently to prevent quality control of an object from being affected by an unexpected measurement result due to the erroneous change.

Further, the measurement condition stored in advance can be read and set by operating the physical key group 34 with the touch panel 33 being in the disabled state. The measurement operator thus easily changes the measurement condition while being prevented from making an incorrect setting. As a result, it is possible to favorably perform a plurality of measurements based on mutually different measurement conditions.

In the exemplary embodiment, the first setting screen SS1 is a screen to receive an input operation regarding one or more parameters that constitute a measurement condition, and the second setting screen SS2 is a screen to receive an input operation to select one of the plurality of measurement conditions stored in the storage 42.

Such a configuration makes it possible to set a variety of measurement conditions and to prevent the measurement operator from changing the variety of measurement conditions by mistake.

The surface texture measuring machine 1 of the exemplary embodiment further includes the input section 412 that identifies an input operation corresponding to each of the keys 34A to 34D for each of the screens displayed on the display section 31. When the second setting screen SS2 is displayed on the display section 31, the input section 412 identifies the input operation from the key group 34 as cursor movement or determination on the measurement condition list.

Such a configuration makes it possible to reduce the number of the physical keys, facilitating downsizing of the surface texture measuring machine 1.

Any other effect is that the surface texture measuring machine 1 of the exemplary embodiment allows the measurement operator to operate not the touch panel 33 but the key group 34 to change the measurement condition or perform the calibration measurement. Thus, even in a case where the measurement operator has difficulty in operating the touch panel 33 such as when he/she wears a glove, the surface texture measuring machine 1 of the exemplary embodiment is useful.

Second Exemplary Embodiment

Description will be made on a second exemplary embodiment of the invention. Since components of the surface texture measuring machine 1 according to the second exemplary embodiment are similar to the components of the surface texture measuring machine 1 according to the first exemplary embodiment, reference signs similar to those of the first exemplary embodiment are used.

In the second exemplary embodiment, the external device 9 outputs a switching signal to switch a state of the touch panel 33 between the disabled state and the enabled state. The surface texture measuring machine 1 can receive the switching signal (a switching instruction) from the external device 9 via the communication section 43.

The input control section 415 switches a state of the touch panel 33 between the disabled state and the enabled state in accordance with the switching instruction inputted from the key 34C or the external device 9. It should be noted that the switching instruction inputted from the key 34C and the switching instruction inputted from the external device 9 are not distinguished from each other.

When the switching instruction is inputted from the external device 9, the display control section 413 also displays, in the status display range common to the screens, the icon 35 indicating that the touch panel 33 is in the disabled state, as in a case where the switching instruction is inputted from the key 34C.

In such a second exemplary embodiment, a state of the touch panel 33 is flexibly switchable between the enabled state and disabled state in accordance with the situation of the administrator or the measurement operator. For instance, after the administrator disables the touch panel 33 from the external device 9, the measurement operator who is instructed by the administrator may enable the touch panel 33 from the key 34C and set a measurement condition from the first setting screen SS1.

Further, when the touch panel 33 is in the disabled state in the second exemplary embodiment, it is possible to call the second setting screen SS2 and set a measurement condition by operating the physical key group 34, as in the first exemplary embodiment. The measurement operator thus easily changes the measurement condition while being prevented from making an incorrect setting, as in the first exemplary embodiment.

Third Exemplary Embodiment

Description will be made on a third exemplary embodiment of the invention. It should be noted that components of the surface texture measuring machine 1 according to the third exemplary embodiment are similar to the components of the surface texture measuring machine 1 according to the first exemplary embodiment.

In the third exemplary embodiment, the external device 9 outputs a switching signal to switch a state of the touch panel 33 between the disabled state and the enabled state. The surface texture measuring machine 1 can receive the switching signal (a switching instruction) from the external device 9 via the communication section 43.

The input control section 415 switches a state of the touch panel 33 between the disabled state and the enabled state in accordance with the switching instruction inputted from the key 34C or the external device 9. Here, when the state of the touch panel 33 is switched from the enabled state to the disabled state in accordance with the switching instruction inputted from the external device 9, the input control section 415 has a state of not receiving any switching instruction regarding the state of the touch panel 33 through the key 34C.

Further, when the state of the touch panel 33 is switched from the disabled state to the enabled state in accordance with the switching instruction inputted from the external device 9, the input control section 415 has a state of receiving a switching instruction regarding the state of the touch panel 33 through the key 34C.

In such a third exemplary embodiment, the measurement operator is not allowed to enable the touch panel 33 from the key 34C after the administrator disables the touch panel 33 from the external device 9. The measurement operator is thus more reliably prevented from incorrectly setting the measurement condition.

Further, when the touch panel 33 is in the disabled state in the third exemplary embodiment, it is possible to call the second setting screen SS2 and set a measurement condition by operating the physical key group 34, as in the first exemplary embodiment. The measurement operator thus easily changes the measurement condition while being prevented from making an incorrect setting, as in the first exemplary embodiment.

Fourth Exemplary Embodiment

Description will be made on a fourth exemplary embodiment of the invention. It should be noted that components of the surface texture measuring machine 1 according to the fourth exemplary embodiment are similar to the components of the surface texture measuring machine 1 according to the first exemplary embodiment.

In the fourth exemplary embodiment, the external device 9 outputs a switching signal to switch a state of the touch panel 33 between the disabled state and the enabled state. The surface texture measuring machine 1 can receive the switching signal (a switching instruction) from the external device 9 via the communication section 43.

The input control section 415 switches a state of the touch panel 33 between the disabled state and the enabled state in accordance with the switching instruction inputted from the key 34C or the external device 9. Here, the input control section 415 performs switching between a first state, a second state, and a third state every time the switching instruction is inputted from the external device 9. In the first state, the touch panel 33 and the key group 34 are both in the enabled state. In the second state, the touch panel 33 and the key group 34 are both in the disabled state. In the third state, the touch panel 33 is in the disabled state and the key group 34 is in the enabled state. It should be noted that the order of switching between the first to third states is changeable as desired.

The display control section 413 may display an icon corresponding to each of the second state and the third state in the status display range common to the screens.

Such a fourth exemplary embodiment is favorable for a case where the administrator operates the surface texture measuring machine 1 using the external device 9. For instance, when starting a communication with the surface texture measuring machine 1 using the external device 9, the administrator causes a switching signal to be sent from the external device 9 to the surface texture measuring machine 1 to put the surface texture measuring machine 1 into the second state. This prevents the operation on the surface texture measuring machine 1 by the measurement operator during the communication between the external device 9 and the surface texture measuring machine 1, and allows the administrator to stably operate the surface texture measuring machine 1 from the external device 9. Further, when terminating the communication with the surface texture measuring machine 1 using the external device 9, the administrator only has to cause a switching signal to be sent from the external device 9 to the surface texture measuring machine 1 to put the surface texture measuring machine 1 into the third state.

When the surface texture measuring machine 1 is in the third state (i.e., when the touch panel 33 is in the disabled state and the key group 34 is in the enabled state) in the fourth exemplary embodiment, it is possible to call the second setting screen SS2 and set a measurement condition by operating the physical key group 34, as in the first exemplary embodiment. The measurement operator thus easily changes the measurement condition while being prevented from making an incorrect setting, as in the first exemplary embodiment.

MODIFICATIONS

The invention is not limited to the above-described exemplary embodiments and modifications and the like are within the scope of the invention as long as the object of the invention is achievable.

Modification 1

In the above exemplary embodiments, the measurement condition list to be displayed on the second setting screen SS2 only has to include one or more measurement conditions stored in the storage 42. A method of causing the storage 42 to store a measurement condition is not limited to the method in which the setting is made through the touch panel 33, and may be a method in which a setting condition set by the external device 9 is to be received.

Further, in the above exemplary embodiments, the second setting screen SS2 displays the plurality of measurement conditions in list form but the invention is not limited thereto. For instance, when auxiliary information (e.g., the type of an object and a purpose for measurement) is associated with the measurement condition, the second setting screen SS2 may display the auxiliary information selectable by operating the key group 34 and a measurement condition corresponding to a selected combination of the auxiliary information may be read from the storage 42.

Modification 2

In the above exemplary embodiments, the input control section 415 switches a state of the touch panel 33 between the disabled state and the enabled state in accordance with the switching instruction inputted from the key 34C or the external device 9, but the invention is not limited thereto. For instance, when the touch panel 33 is in the enabled state, the input control section 415 may switch a state of the touch panel 33 from the enabled state to the disabled state in accordance with the switching instruction inputted through the touch panel 33. Alternatively, the input control section 415 may receive the switching instruction only from the external device 9.

Modification 3

In the above exemplary embodiments, the work screen SS3 is displayed by operating the key 34D and the second setting screen SS2 is displayed by operating the key group 34 with respect to the work screen SS3; however, the display of the work screen SS3 may be omitted. In other words, the second setting screen SS2 may be directly displayed by operating the key 34D.

Modification 4

In the above exemplary embodiments or Modification 3, when the touch panel 33 is in the disabled state, the work screen SS3 or the second setting screen SS2 is displayed in response to the operation on a predetermined key (the key 34D in the exemplary embodiment), but the invention is not limited thereto. In other words, even when the touch panel 33 is in the enabled state, the work screen SS3 or the second setting screen SS2 may be displayed in response to the operation on a predetermined key (the key 34D in the exemplary embodiment), as in the case where the touch panel 33 is in the disabled state.

Modification 5

In the above exemplary embodiments, the key group 34 includes, by way of example, the keys 34A to 34D. The invention, however, is not limited thereto. In other words, the number and types of the keys of the key group 34 are not limited to those exemplified in the above exemplary embodiments.

Modification 6

In the above exemplary embodiments, the surface texture measuring machine 1 of a hand-held type is exemplified. The surface texture measuring machine 1 may, however, be a mountable device in which the detector 10 is movably supported by a portal column, an articulated arm, or the like.

Further, in the above exemplary embodiments, the surface texture measuring machine 1 is described. The invention, however, is not limited thereto. The measuring device of the invention may be any device as long as a measurement condition can be set through a touch panel, such as a height measuring machine or a roundness measuring machine.

What is claimed is:

1. A measuring device comprising:
   a display section;
   a touch panel arranged on the display section to overlap therewith;
   a key group comprising a plurality of physical keys;
   a display control section configured to cause a first setting screen to be displayed on the display section;
   a setting section configured to create a measurement condition in accordance with an input operation on the first setting screen through the touch panel;

a storage configured to store the measurement condition created by the setting section; and an input control section configured to switch a state of the touch panel between a disabled state and an enabled state, wherein in a case where the touch panel is in the disabled state, the display control section is configured to cause a second setting screen to be displayed on the display section in accordance with an input operation through the key group, and the setting section is configured to read the measurement condition from the storage in accordance with an input operation on the second setting screen through the key group.

2. The measuring device according to claim 1, wherein the input control section is configured to switch a state of the touch panel between the disabled state and the enabled state in accordance with a switching instruction inputted from one of the keys or an external device.

3. The measuring device according to claim 2, wherein in a case where the state of the touch panel is switched from the enabled state to the disabled state in accordance with the switching instruction inputted from the external device, the input control section has a state of receiving no switching instruction through any of the keys.

4. The measuring device according to claim 2, wherein the input control section is configured to perform switching between a first state, a second state, and a third state every time the switching instruction is inputted from the external device, the first state being a state where the touch panel and the key group are both in the enabled state, the second state being a state where the touch panel and the key group are both in the disabled state, the third state being a state where the touch panel is in the disabled state and the key group is in the enabled state.

5. The measuring device according to claim 1, wherein the first setting screen is configured to receive an input operation regarding one or more parameters that constitute the measurement condition, the measurement condition comprises a plurality of measurement conditions, and the second setting screen is configured to receive an input operation to select one of the plurality of measurement conditions stored in the storage.

6. The measuring device according to claim 5, further comprising an input section configured to identify the input operation corresponding to each of the keys for each of the screens displayed on the display section, wherein the second setting screen is configured to display a measurement condition list comprising, in list form, the plurality of measurement conditions stored in the storage, and in a case where the second setting screen is displayed on the display section, the input section is configured to identify the input operation from the key group as cursor movement or determination on the measurement condition list.

\* \* \* \* \*